(12) United States Patent
van Petegem et al.

(10) Patent No.: US 8,550,478 B2
(45) Date of Patent: Oct. 8, 2013

(54) BUGGY PROVIDED WITH A BRAKING MECHANISM

(75) Inventors: Fiona van Petegem, Amsterdam (NL); Eric Biermann, Amsterdam (NL); Sander van Oosterum, Amsterdam (NL); Erik Baas, Amsterdam (NL); Aukje Peters, Amsterdam (NL)

(73) Assignee: Nuna International B.V. (NL)

( * ) Notice: Subject to any disclaimer, the term of this patent is extended or adjusted under 35 U.S.C. 154(b) by 205 days.

(21) Appl. No.: 12/692,764

(22) Filed: Jan. 25, 2010

(65) Prior Publication Data
US 2010/0187786 A1      Jul. 29, 2010

Related U.S. Application Data

(60) Provisional application No. 61/146,661, filed on Jan. 23, 2009.

(51) Int. Cl.
*B62B 7/00*      (2006.01)
*B62D 39/00*     (2006.01)
*B62B 9/08*      (2006.01)

(52) U.S. Cl.
USPC ............... 280/47.38; 280/33.994; 188/20

(58) Field of Classification Search
USPC ............ 280/47.38, 33.994; 188/19, 20; 267/5
See application file for complete search history.

(56) References Cited

U.S. PATENT DOCUMENTS

| 1,331,513 | A | | 2/1920 | Lindberg | |
|---|---|---|---|---|---|
| 5,460,399 | A | * | 10/1995 | Baechler et al. | 280/650 |
| 6,170,615 | B1 | * | 1/2001 | Cheng | 188/20 |
| 6,341,672 | B1 | * | 1/2002 | Yang et al. | 188/20 |
| 6,408,990 | B1 | * | 6/2002 | Chen | 188/20 |
| 6,742,791 | B2 | * | 6/2004 | Lan | 280/62 |
| 7,219,918 | B2 | * | 5/2007 | Lan | 280/642 |
| 8,201,667 | B2 | * | 6/2012 | Chen et al. | 188/20 |
| 8,205,723 | B2 | * | 6/2012 | Liao | 188/19 |
| 2007/0051565 | A1 | * | 3/2007 | Chen | 188/19 |
| 2007/0170015 | A1 | * | 7/2007 | Chen | 188/20 |
| 2008/0073878 | A1 | * | 3/2008 | Li | 280/642 |
| 2008/0185236 | A1 | * | 8/2008 | Chen et al. | 188/20 |

FOREIGN PATENT DOCUMENTS

| EP | 0633178 | 1/1995 |
|---|---|---|
| GB | 234419 | 7/2007 |
| WO | 2007053018 | 5/2007 |

* cited by examiner

*Primary Examiner* — J. Allen Shriver, II
*Assistant Examiner* — James M Dolak
(74) *Attorney, Agent, or Firm* — Banner & Witcoff, Ltd.

(57) ABSTRACT

A buggy includes a frame, at least one wheel coupled to the frame and formed with a recess, and a braking mechanism provided to the wheel and including a braking rod that has a first end. The braking mechanism is movable between a free position, where the first end of the braking rod is free from the wheel and the wheel is rotatable, and a braking position, where the first end of the braking rod is received in the recess in the wheel such that the rotation of the wheel is limited.

12 Claims, 7 Drawing Sheets

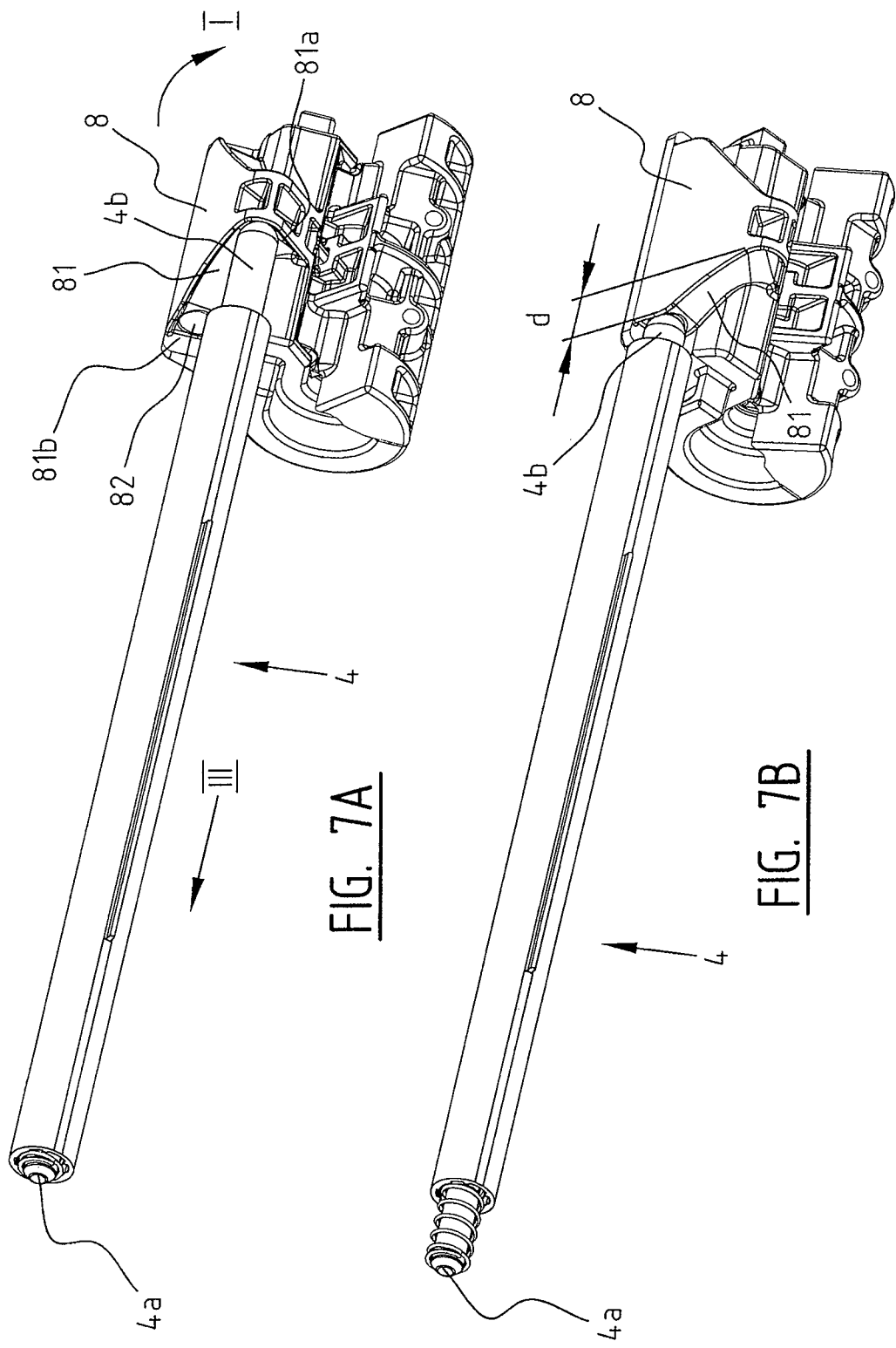

BUGGY PROVIDED WITH A BRAKING MECHANISM

CROSS-REFERENCE TO RELATED APPLICATION

This application claims priority of U.S. Provisional Application No. 61/146,661, filed on Jan. 23, 2009.

BACKGROUND OF THE INVENTION

1. Field of the Invention

The present invention relates to a buggy with a frame and at least one wheel provided with a braking mechanism. The braking mechanism is movable between a free position wherein the wheel is rotatable, and a braking position wherein the rotation of the wheel is limited.

2. Description of the Related Art

A buggy or a stroller for transporting a child normally comprises at least three wheels which are interconnected by a frame. The wheels are usually connected to the frame using suitable axles allowing rotation of the wheels with as little friction as possible. A buggy is additionally provided with a seat assembly to comfortably hold the child. A stroller is usually furthermore provided with push bars allowing the stroller to be pushed.

For instance, when placing the child in the seat assembly, it is favourable when the stroller is provided with a brake. Limiting the rotation of at least one of the wheels, preferably two, prevents the stroller from rolling backward due to a force in the backward direction when placing the child in the seat. Also, in other circumstances, a braking mechanism comes in hand, for instance on sloping surfaces or simply for preventing any movement of the stroller.

In the known buggies, the braking mechanism can be moved between a free position wherein the wheel is allowed to rotate, and a braking position wherein at least one of the wheels is locked, preventing any substantial movement of the stroller. A known braking mechanism includes clamping means which engages an outer surface of the wheel. Such a mechanism is hard to be moved to the braking position due to a strong clamping action of the clamping means on the wheel.

SUMMARY OF THE INVENTION

It is an object of the invention to provide a buggy with a compact, easy to use and/or efficient braking mechanism.

In order to accomplish that objective, in a stroller according to the invention, the braking mechanism is movable between a free position wherein a braking rod is free from the wheel, and a braking position wherein a first end of the braking rod is received in a recess provided in the wheel, such that the rotation of the wheel is limited. By inserting the first end of the braking rod in a recess provided in the wheel, the rotation of the wheel is limited which results in a firm braking action. In order to unlock the wheel, the braking mechanism is moved toward the free position, and the braking rod is taken out of the recess, thereby allowing rotation of the wheel. The first end of the braking rod extends at a distance from the wheel when the braking mechanism is at the free position. Preferably, the wheel is provided with a plurality of recesses or holes, allowing a braking action substantially regardless of the orientation of the wheel.

Preferably, the braking rod is movable in a direction substantially parallel to the axis of the wheel. This allows a compact composition of the braking mechanism. The recess hereby extends in the wheel at a radial location with respect to the axle of the wheel. More preferably, the wheel is provided with a plurality of angularly-arranged recesses surrounding the axle in order to receive the first end of the braking rod at substantially all angular positions of the wheel.

According to a preferred embodiment of the buggy of the invention, the braking mechanism includes a moving member for driving the movement of the braking rod, wherein the moving member is formed with an engaging surface that extends obliquely with respect to the axis of the braking rod for engaging a second end of the braking rod. When the moving member is rotated, the second end of the braking rod is guided slidably over the engaging surface, and the braking rod is moved in a longitudinal direction. By rotating the moving member, the braking rod can therefore be moved in and out of the recess provided in the wheel, thereby moving the braking mechanism between the free and the braking positions.

By providing an engaging surface under an angle with respect to a longitudinal axis of the braking rod, the distance between the wheel and the engaging surface along the axis of the braking rod can be changed by moving the engaging surface relative to the braking rod. Preferably, the moving member is in the form of a wedge having the engaging surface that provides a varying distance from the wheel. By rotating the moving member, the braking rod is movable preferably in a direction parallel to the axle of the wheel.

When the braking mechanism is at the free position, the second end of the braking rod engages the engaging surface, and the braking rod extends at a distance away from the wheel. By rotating the moving member, the engaging surface is moved with respect to the braking rod. When the second end of the braking rod is moved to engage another part of the engaging surface, the braking rod moves toward the wheel and eventually locks the wheel at the braking position.

Preferably, the engaging surface is formed with a recess for receiving the second end of the braking rod when the braking mechanism is at the braking position. The recess locks the braking rod on the engaging surface at the braking position so as to prevent the braking mechanism from accidentally moving from the braking position to the free position. By applying a suitable amount of force on the moving member, the braking rod can slip out of the recess, thereby allowing a movement of the braking mechanism to the free position.

The braking mechanism further comprises a pedal movable with respect to the moving member for moving the moving member. This allows a degree of freedom of the pedal with respect to the moving member. The pedal can, for instance, be manipulated by foot to move the moving member so as to move the braking mechanism from the braking position to the free position and vice versa.

Preferably, the pedal is movable between an initial position where the braking mechanism is at the free position, and first and second positions where the braking mechanism is at the braking position. The pedal is preferably movable between the first and second positions without substantially moving the moving member.

More preferably, the pedal is biased towards the second position. When the pedal is moved from the initial position to the first position, the moving member is moved to rotate and moving the braking rod along a longitudinal direction. When the pedal is released, it is automatically biased towards the second position. Preferably, a spring is arranged to move the pedal with respect to the moving member towards the second position. When the braking mechanism is at the braking position, the braking rod is preferably received in the recess provided in the engaging surface, thereby preventing any movement of the moving member. This also limits the movement of the pedal. When the braking rod is removed from the recess in the engaging surface, the moving member is free to move so that the braking mechanism can be moved towards the free position due to the biasing action on the pedal.

According to the preferred embodiment of the buggy according to the invention, movement of the pedal from the initial position in a first direction to the first position moves the moving member to move the braking mechanism from the free position to the braking position. Moreover, the pedal is movable in a second direction opposite to the first direction from the first to the second position. Further movement of the pedal from the second position in the second direction moves the pedal back to the initial position, moving the moving member from the braking position to the free position. Preferably, the pedal is biased towards the second direction. More preferably, the spring provided to force the pedal to move in the second direction is a torsion spring.

The pedal is therefore preferably movable between a first position and a second position with respect to the moving member. When the pedal is moved in the first direction to the first position with respect to the moving member, the moving member is moved in the first direction. When the pedal is however moved in the second direction from the first position, the pedal first moves to the second position with respect to the moving member before moving the moving member in the second direction.

Preferably, when the braking mechanism is at the free position, the pedal is only allowed to be move in the first direction with respect to the moving member. This ensures movement of the moving member in the first direction when the pedal is moved in the first direction. Preferably, when the pedal is at the initial position, it is thus not allowed to move with respect to the moving member. The pedal can hereto for instance be limited in movement by the frame. This ensures that the biasing force in the second direction does not move the pedal further in the second direction when the braking mechanism is at the free position. Otherwise, when the braking mechanism of the buggy of this invention is acted, the pedal would be allowed to move in the first direction without moving the moving member, thereby resulting in no braking action.

Since the pedal is biased in the second direction, it then automatically moves from the first position to the second position with respect to the moving member when not manipulated. At that time, if the moving member is not restricted to move, for instance by the engagement between the braking rod and the recess in the engaging surface, the moving member will therefore also move in the second direction to thereby move the braking mechanism towards the free position.

It is in particular advantageous when the pedal is movable between the initial position where the braking rod is free from the wheel, and the first and second positions wherein the pedal is biased at the second position with respect to the moving member. The pedal hereby has three orientations, the initial and the first and second positions, wherein the pedal will automatically move from the first position to the second position when the pedal is released.

According to the preferred embodiment of the buggy according to the invention, the moving member is rotatable around a rotational axis parallel to the axis of the braking rod, and the engaging surface extends obliquely and radially with respect to the rotational axis. By rotating the moving member, the engaging surface is moved with respect to the second end of the braking rod, moving the braking rod in the longitudinal direction. Dependent on the angle of rotation of the moving member around the rotational axis, the braking rod is moved.

Preferably, the pedal is rotatable around the rotational axis of the moving member. In this configuration, the moving member and the pedal rotate around the same axis, resulting in an efficient angular movement between the two.

According to the preferred embodiment, when the pedal is at the initial position, the braking mechanism is at the free position, and the pedal at least partially extends above a plane of the frame of the buggy. When the pedal is at the first position, the braking mechanism is at the braking position, and the pedal at least partially extends under the plane of the frame. When the pedal is at the second position, it is substantially flush with the frame.

The movement of the pedal from the first position to the second position allows easy manipulation of the pedal since the pedal is then substantially flush with the frame, or at least extends more in the second direction with respect to the first position.

It is furthermore advantageous when the rotational axis is formed by the axle of the wheel. This results in a compact and efficient composition of the braking mechanism and renders the need for an additional shaft as a rotational axis obsolete.

According to the preferred embodiment of the buggy, the first direction comprises a component in the downward direction, and the second direction comprises a component in the upward direction.

The working of a highly preferred embodiment of the invention is as follows. When the braking mechanism is at the free position, the pedal is limited at the initial position with respect to the moving member. By pressing the pedal downwardly, the pedal rotates in the first direction, thereby also rotating the moving member in the first direction. Due to the oblique engaging surface, the first end of the braking rod is moved into the recess provided in the wheel, such that the rotation of the wheel is limited. At the same time, the second end of the braking rod engages the recess in the engaging surface, such that the rotation of the moving member is limited.

When the pedal is released, the torsion spring rotates the pedal upwardly from the first position to the second position with respect to the moving member. Since the moving member is restricted from rotating due to the engagement between the braking rod and the recess in the engaging surface, the pedal is not able to rotate the moving member further in the second direction towards the free position of the moving member.

When the pedal is at the second position, by applying sufficient upward pressure on the pedal, for instance by using a foot to force the pedal, the second end of the braking rod is released from the recess in the engaging surface. The moving member is then free to rotate, and due to the biasing action on the pedal, the moving member will rotate with the pedal, thereby moving the braking mechanism back to the free position. Afterward, the movement of the pedal is limited such that when the moving member is at the free position, the pedal is limited at the initial position with respect to the moving member.

According to the preferred embodiment of the buggy according to the invention, the braking rod further includes a return spring for returning the braking rod from the braking position to the free position when the moving member moves toward the free position. The return spring is preferably arranged between the frame and the braking rod for biasing the braking rod to move away from the wheel.

Preferably, when the braking rod provided with the return spring engages the engaging surface, and the moving member is moved towards the free position, the moving member then moves the pedal in the second direction as mentioned above. The return spring hereby functions as biasing means for the pedal.

According to the preferred embodiment of the buggy, the braking rod further includes an aligning spring arranged to be compressed when the braking rod is moved in the longitudinal direction while the braking rod is not aligned with the recess provided in the wheel. This will result in a proper introduction of the first end of the braking rod when the wheel is slightly moved to align the braking rod and the recess in the wheel.

The return spring further facilitates the movement of the second end of the braking rod to slip out of the recess provided in the engaging surface during the movement of the braking mechanism from the braking position to the free position. The stiffnesses of the torsion spring, aligning springs and return spring can be adjusted to the preferred force needed to unlock the wheel by foot.

BRIEF DESCRIPTION OF THE DRAWINGS

Other features and advantages of the present invention will become apparent in the following detailed description of the preferred embodiment with reference to the accompanying drawings, of which:

FIG. 7A is a fragmentary perspective view of the braking mechanism of the preferred embodiment at the free position;

FIG. 7B is a view similar to FIG. 7A, but illustrating the braking mechanism at the braking position;

DETAILED DESCRIPTION OF THE PREFERRED EMBODIMENT

Figure 1A:
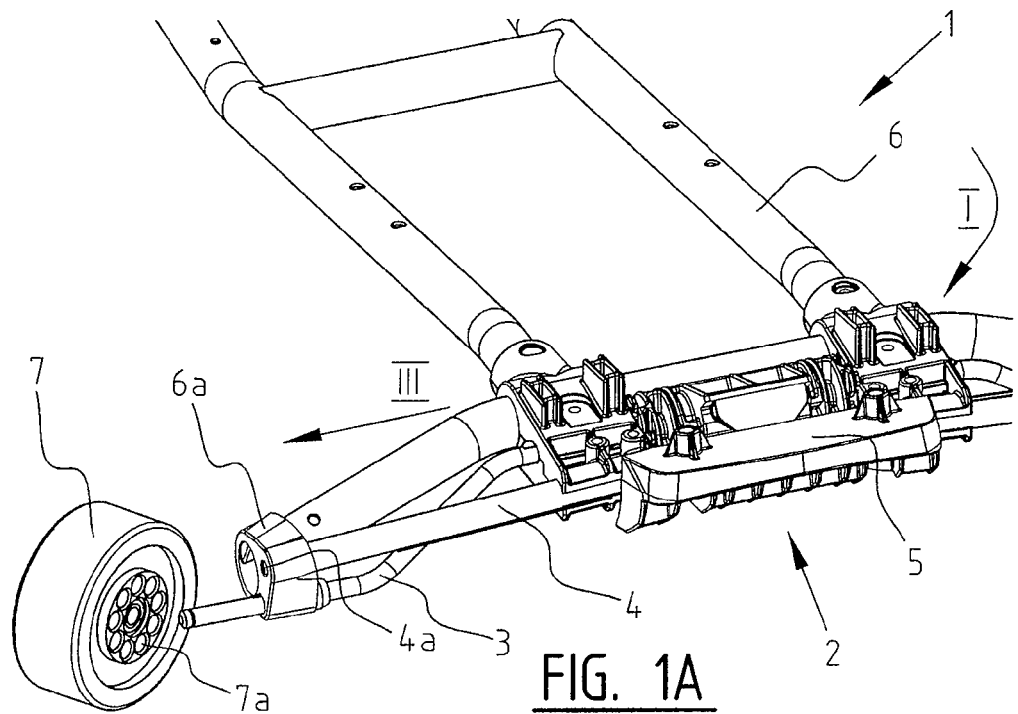
FIG. 1A is a fragmentary perspective, partly exploded view of a preferred embodiment of a buggy according to the invention, illustrating a braking mechanism at a free position.
Figure 1B:
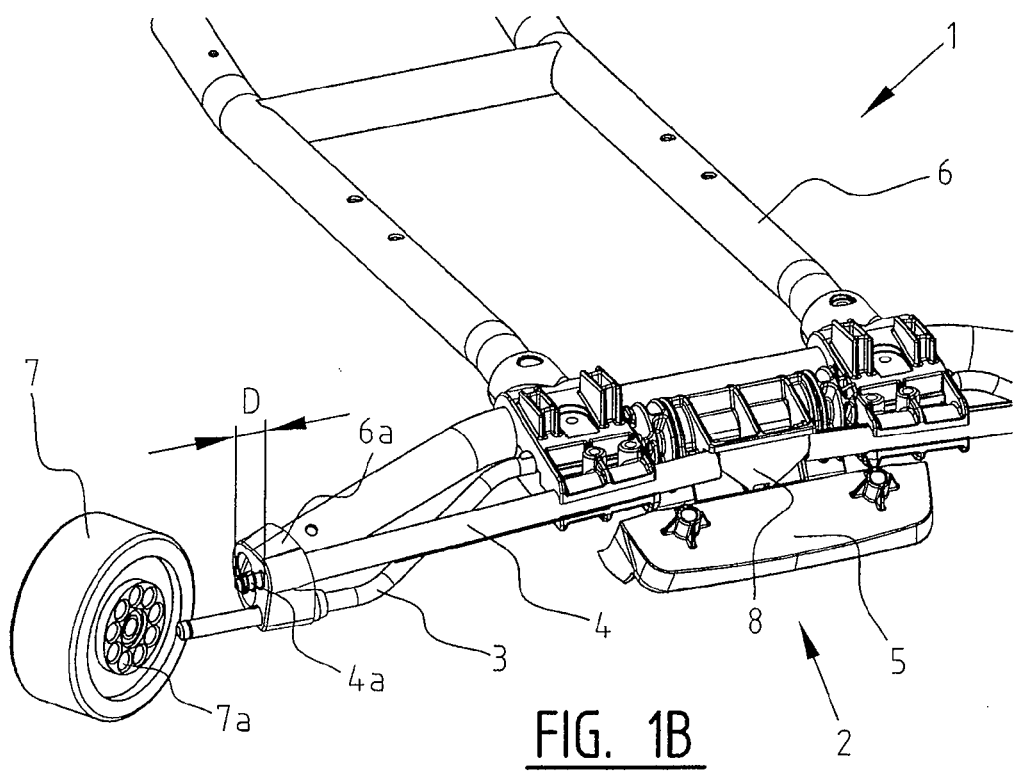
FIG. 1B is a view similar to FIG. 1, but illustrating the braking mechanism at a braking position.
Figure 9:
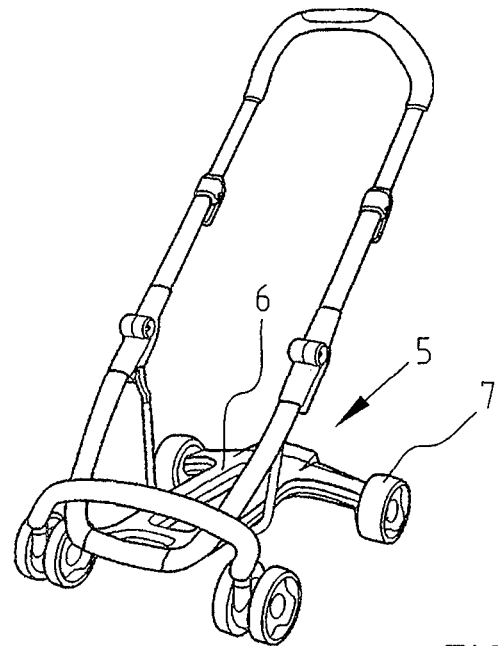
FIG. 9 is a perspective view of the preferred embodiment.

In FIGS. 9, 1A and 1B, the preferred embodiment of a buggy 1 according to the invention is shown. The buggy 1 comprises a frame 6 on which a seating assembly (not shown) is mounted. The buggy 1 is provided with four wheels coupled rotatably to the frame 6 whereby the rear wheels 7 are provided with a braking mechanism 2. For the sake of clarity, one of the rear wheels 7 is shown in a disconnected state in FIGS. 1A and 1B. The braking mechanism 2 is arranged to be movable between a free position wherein the rear wheels 7 are rotatable around an axle 3, and a braking position wherein the rotations of the rear wheels 7 are limited. For convenience of illustration, only one of the rear wheels 7 will be mentioned in the following description.

In order to provide an efficient braking mechanism 2, a braking rod 4 is provided to be movable in a third direction (III) indicated in FIG. 1A (i.e., a longitudinal direction). In FIG. 1A, the braking mechanism 2 is at the free position wherein a first end 4a of the braking rod 4 extends at a distance from the rear wheel 7 (i.e., free from the rear wheel 7). As shown in FIGS. 1A and 1B, the rear wheel 7 is formed with a plurality of recesses 7a surrounding the axle 3. When the braking mechanism 2 is operated, the braking rod 4 moves in the third direction (III), and the first end 4a of the braking rod 4 extends at a distance D from a wheelbase 6a as shown in FIG. 1B, which shows the braking mechanism 2 at the braking position. The first end 4a will be received in a respective one of the axle-surrounding recesses 7a in the rear wheel 7 such that the rotation of the one of the rear wheels 7 is limited.

To move the braking mechanism 2 between the free position and the braking position, a pedal 5 is provided which is operably connected to a moving member 8 in the form of a wedge as will be explained in more detail below. The pedal 5 is arranged to be pressed in a first direction (I) indicated in FIG. 1A, such that the braking mechanism 2 is moved from the free position as shown in FIG. 1A to the braking position as shown in FIG. 1B.

Figure 2A:
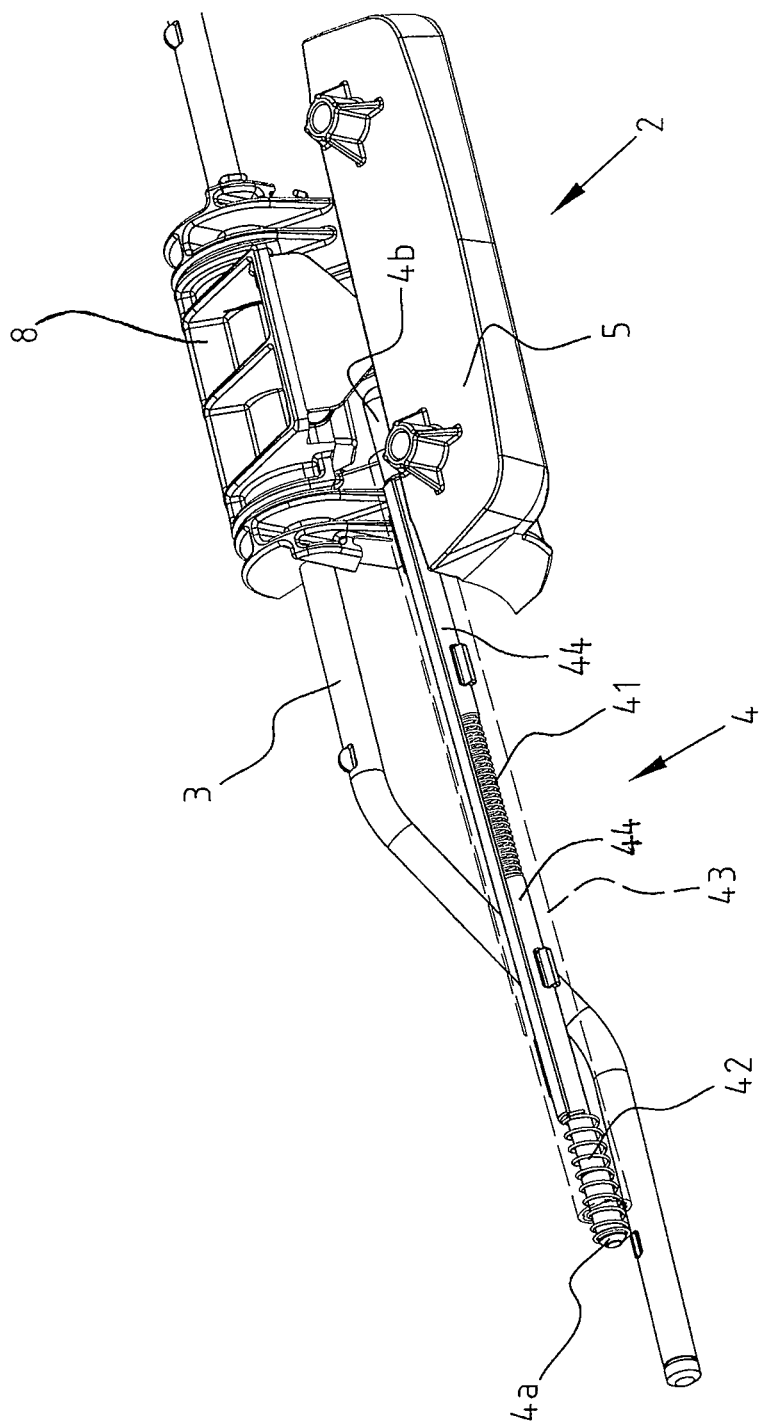
FIG. 2A is a fragmentary perspective view of the braking mechanism of the preferred embodiment.
Figure 2B:
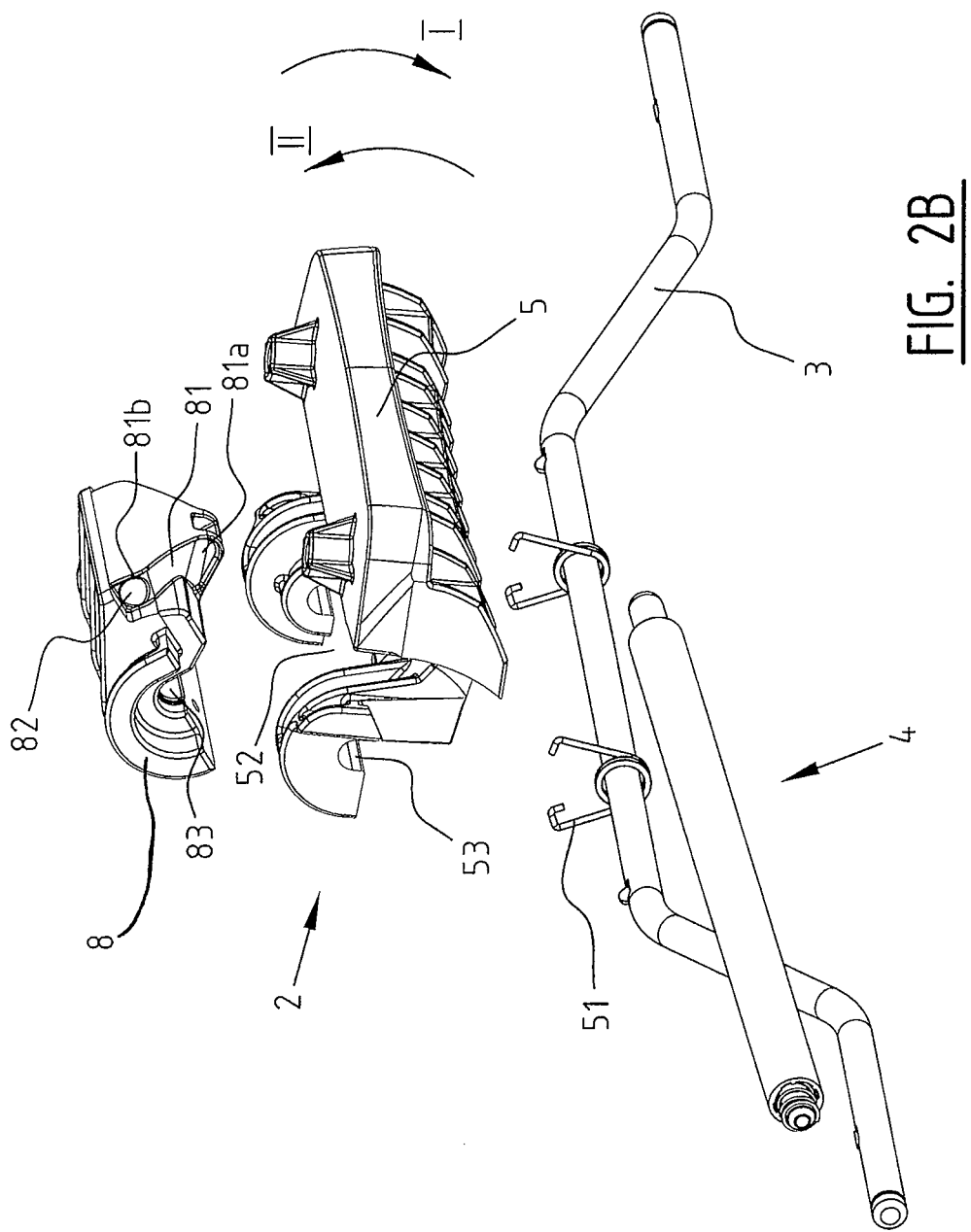
FIG. 2B is an exploded perspective view of the braking mechanism of the preferred embodiment.
Figure 3:
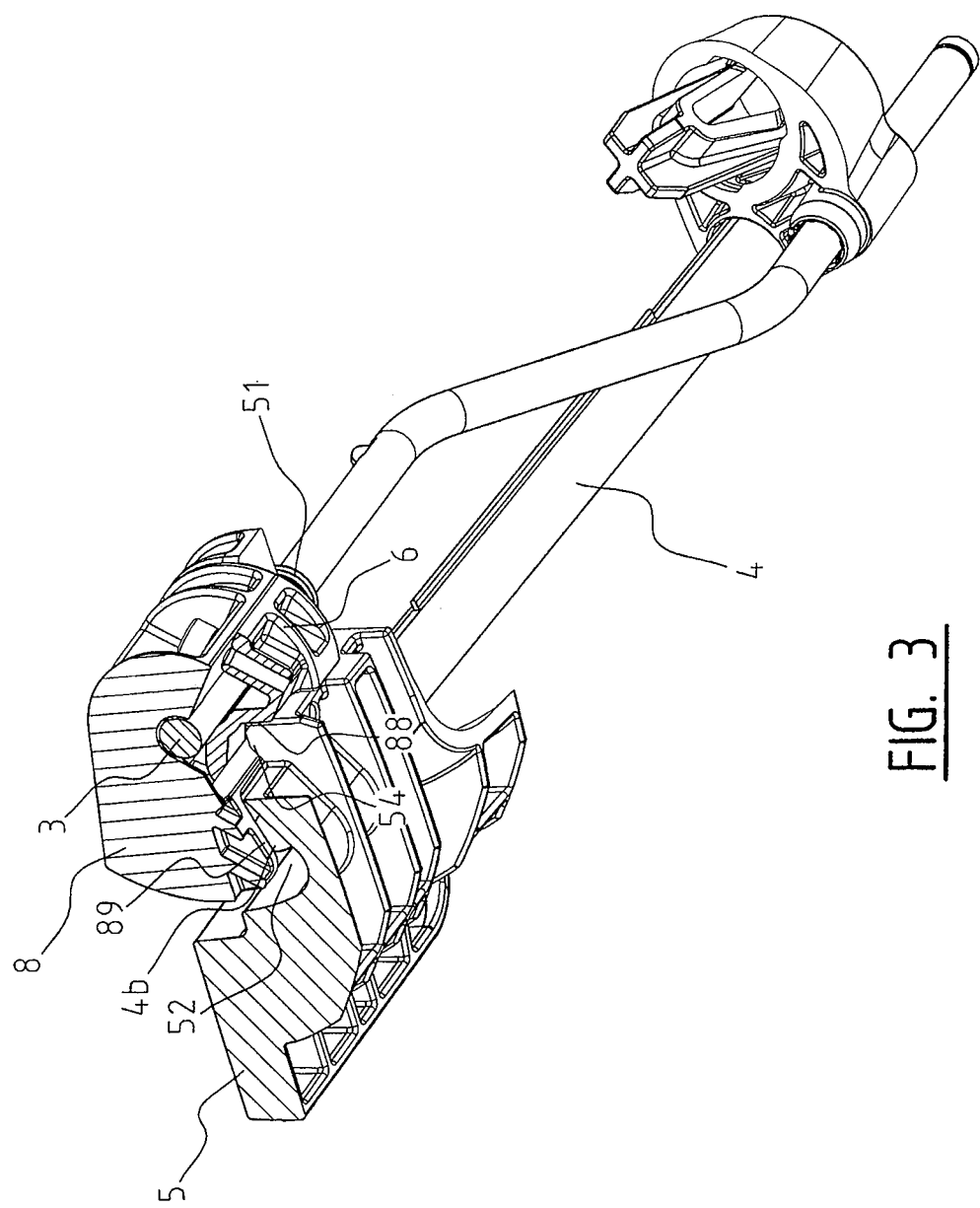
FIG. 3 is a perspective partly sectional view of the braking mechanism of the preferred embodiment.

In FIGS. 2A and 2B, the braking mechanism 2 according to the invention is shown in more detail. The pedal 5 is rotatable with respect to the moving member 8. The moving member 8 is received in a recess 52 of the pedal 5. The moving member 8 and the pedal 5 are rotatable around the axle 3 which forms the axle of the rear wheel 7. The pedal 5 and the moving member 8 are formed respectively with suitable reception surfaces 53, 83 to enable rotation of the pedal 5 and the moving member 8 around a rotational axis that is formed by the axle 3 and that is parallel to the axis of the braking rod 4. The pedal 5 is provided with torsion springs 51 to bias the pedal 5 in a second direction (II) which is indicated in FIG. 2B and which is opposite to the first direction (I).

The moving member 8 is further formed with an engaging surface 81 which extends obliquely with respect to the axis of the braking rod 4. The engaging surface 81 is a curved surface wherein a first end 81a thereof extends at a predetermined distance from the rear wheel 7 and a second end 81b thereof extends closer to the rear wheel 7. Before the moving member 8 is rotated in the first direction (I), a second end 4b of the braking rod 4 engages the engaging surface 81 near the first end 81a, and the braking mechanism 2 is at the free position as shown in FIG. 1A. When the moving member 8 is rotated in the first direction (I), the second end 4b of the braking rod 4 is guided slidably over the engaging surface 81 to drive the braking rod 4 to move in the third direction (III), and eventually engages the engaging surface 81 near the second end 81b, while the braking mechanism 2 is moved to the braking position as shown in FIG. 1B.

The engaging surface 81 is formed with a recess 82 at a position near the second end 81b to lock the braking rod 4 when the braking mechanism 2 is at the braking position. The braking rod 4 is extendable into the recess 82 to prevent the moving member 8 from rotating as will be explained in more detail below.

The braking rod 4 includes a housing 43 in the form of a tube which contains various parts of the braking rod 4. In this embodiment, the braking rod 4 further includes a pair of rod sections 44 and an aligning spring 41 disposed within the housing 43. The rod sections 44 are formed respectively with the first and second ends 4a, 4b. The aligning spring 41a interconnects the rod sections 44, and is disposed to provide pressure to the braking rod 4 when the first end 4a of the braking rod 4 is not correctly aligned with one of the recesses 7a in the rear wheel 7 during the movement of the braking mechanism 2 from the free position to the braking position. When the wheel 7 is slightly rotated to result in correct alignment of the braking rod 4 with one of the recesses 7a, the aligning spring 41 urges the first end 4a to be retained in the aligned one of the recesses 7a. The braking rod 4 further includes a return spring 42 for biasing the braking rod 4 in a direction opposite to the third direction (III) when the braking mechanism 2 is moved from the braking position to the free position.

Figure 4:
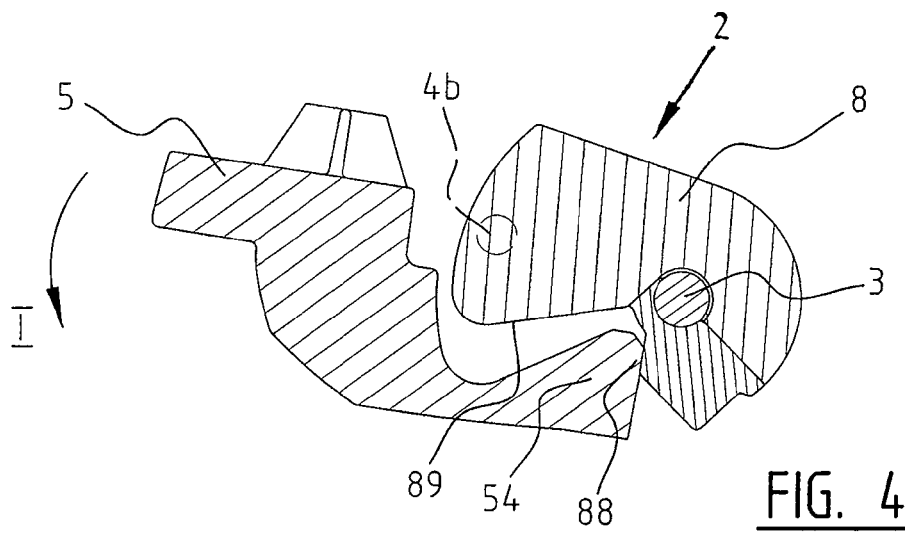
FIGS. 4 to 6 illustrate the operation of the braking mechanism of the preferred embodiment.
Figures 8A, 8B:
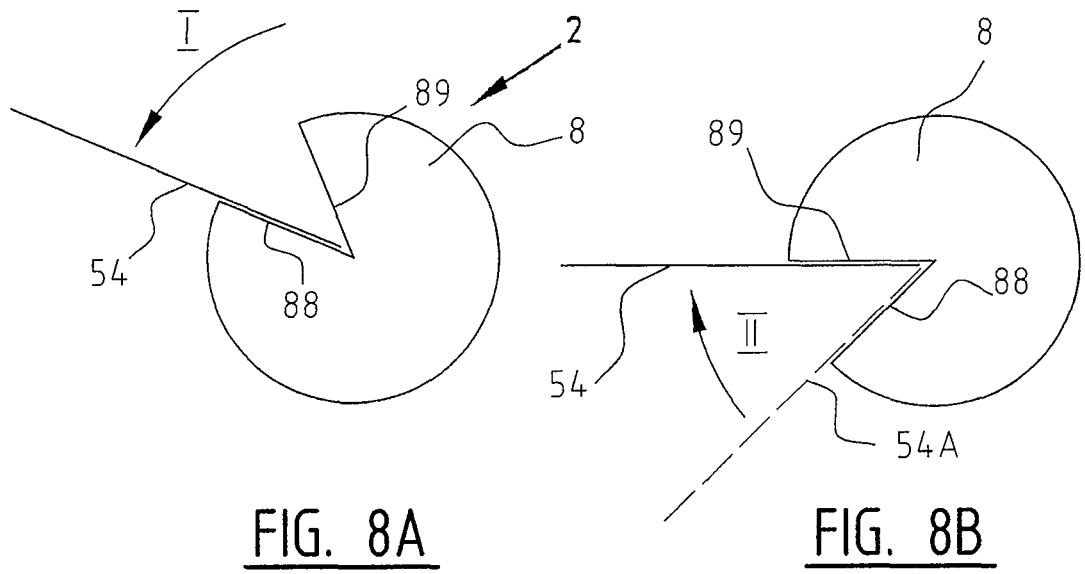
FIG. 8A is a schematic view of the braking mechanism of the preferred embodiment, illustrating a pedal at a first position.
FIG. 8B is a view similar to FIG. 8A, but illustrating the pedal at a second position.

When the braking mechanism 2 is at the free position as shown for instance in FIGS. 1A, 4 and 8A, the pedal 5 is at an initial position and extends above the frame 6 of the buggy 1. This situation is also schematically shown in FIG. 7A. In this situation, the braking rod 4 extends at a distance from the rear wheel 7, and the second end 4b of the braking rod 4 engages the engaging surface 81 near the first end 81a.

When exerted by a force in the first direction (I), the pedal 5 is rotated around the rotational axis formed by the axle 3 in the first direction (I). Since the pedal 5 engages the moving member 8 with a protrusion 54 of the pedal 5 abutting against a surface 88 of the moving member 8, the moving member 8 is also driven to rotate in the first direction (I) around the rotational axis formed by the axle 3. This situation is also shown in FIG. 8A wherein the protrusion 54 of the pedal 5 and the moving member 8 are schematically shown.

Figure 5:
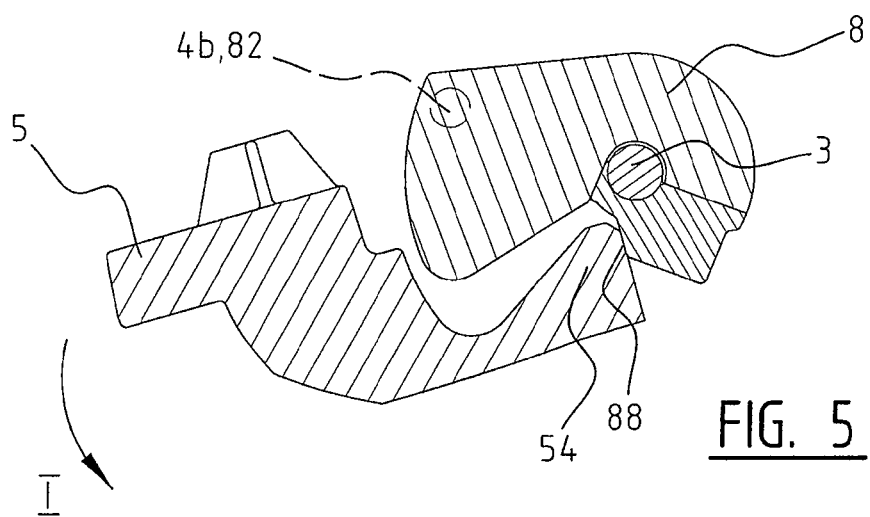
Figure 6:
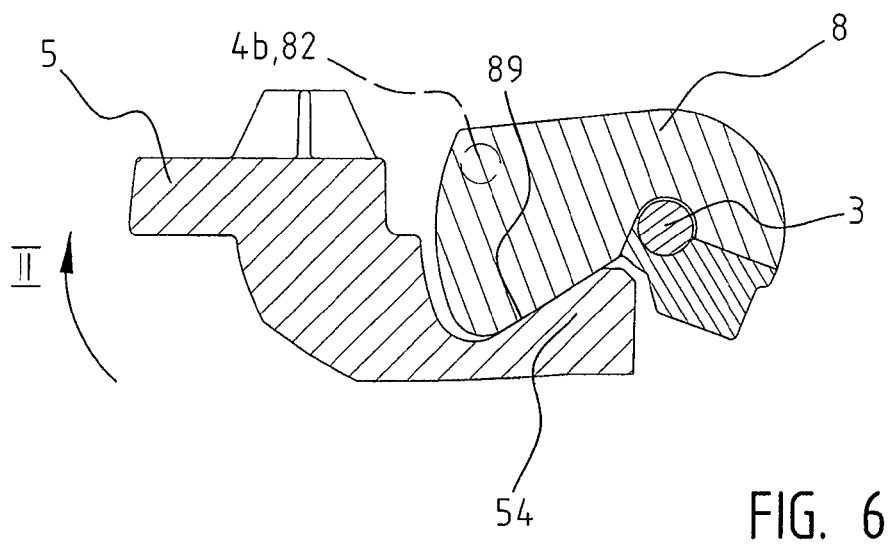

Due to the rotation of the moving member 8 in the first direction (I), the second end 4b of the braking rod 4 is moved in the third direction (III) as shown in FIGS. 4 and 7A. The rotation of the pedal 5 in the first direction (I) eventually moves the braking mechanism to the braking position as shown in FIGS. 5 and 7B, wherein the second end 4b of the braking rod 4 is received in the recess 82 in the engaging surface 81. As can be seen from FIG. 7B, the braking rod 4 is moved in the third direction (III) over a distance (d) towards the rear wheel 7. In this situation, the pedal 5 is at a first position as further shown in dotted line (54A) in FIG. 8B. The pedal 5 hereby is under the plane of the frame 6.

When the force exerted on the pedal 5 is released, the pedal 5 is biased to rotate in the second direction (II) due to a restoring force of the torsion springs 51. The pedal 5 is first biased to rotate from the first position to a second position with respect to the moving member 8. This is shown schematically in FIG. 8B wherein the pedal 5 is moved from the first position to the second position without substantially moving the moving member 8, while the protrusion 54 of the pedal 5 is moved from a position shown in dotted line (54A) to another position due to the restoring force of the torsion springs 51 and engages another surface 89 of the moving member 8.

At this time, due to the extension of the second end 4b of the braking rod 4 in the recess 82 in the engaging surface 81, the moving member 8 can not be rotated in the second direction (II) by the restoring force of the torsion springs 51. Only when a sufficient force is applied on the pedal 5 in the second direction (II), the second end 4b of the braking rod 4 can be biased to slip out of the recess 82 while the return spring is compressed. Preferably, the pedal 5 is substantially flush with the frame 6 when the pedal 5 is at the second position. More preferably, the frame 6 is substantially flush with the housing 43 when the pedal 5 is at the second position. Even more preferably, the housing 43 forms a substantially horizontal board, wherein the pedal 6 is substantially flush with the board. Afterward, the moving member 8 is free to be biased by the pedal 5 to rotate back to the free position as indicated in FIGS. 4 and 8A. The pedal 5 then can not be moved further in the second direction (II) with respect to the moving member 8 since the pedal 5 is restricted for moving further than the initial position indicated in FIGS. 4 and 8A.

It is also possible that the moving member 8 is biased in the second direction (II) due to a restoring force of the return spring 42. Once the second end 4b of the braking rod 4 is free from the recess 82, it engages slidably the engaging surface 81. This engagement between the second end 4b and the engaging surface 81 moves the moving member 8 in the second direction (II). During the movement of the moving member 8 in the second direction (II), the pedal 5 moves to the first position with respect to the moving member 8 as indicated in dotted line (54A) in FIG. 8B. Further movement of the moving member 8 in the second direction (II) then moves the pedal 5 in the second direction (II), and eventually results in the situation where the braking mechanism 2 is at the free position as indicated in FIGS. 8A and 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A buggy comprising:
   a frame;
   at least one wheel coupled to said frame and formed with a recess; and
   a braking mechanism provided for said at least one wheel and including a braking rod that has a first end, said braking mechanism being movable between a free position, where said first end of said braking rod is free from said at least one wheel and said at least one wheel is rotatable, and a braking position, where said first end of said braking rod is received in said recess in said at least one wheel such that the rotation of said at least one wheel is limited;
   wherein said braking rod includes an aligning spring disposed for providing pressure to said braking rod toward said recess when said braking rod is not aligned with said recess in said wheel during the movement of said braking mechanism from the free position to the braking position;
   wherein said braking rod includes a return spring for biasing said braking rod to move in a longitudinal direction, thereby resulting in the movement of said braking mechanism from the braking position to the free position.

2. The buggy as claimed in claim 1, wherein said braking rod further includes a pair of rod sections, said aligning spring interconnecting said rod sections.

3. A buggy comprising:
   a frame;
   at least one wheel coupled to said frame and formed with a recess; and
   a braking mechanism provided to said at least one wheel and including a braking rod that has a first end, said braking mechanism being movable between a free position, where said first end of said braking rod is free from said at least one wheel and said at least one wheel is rotatable, and a braking position, where said first end of said braking rod is received in said recess in said at least one wheel such that the rotation of said at least one wheel is limited;
   wherein said braking mechanism further includes a moving member that is formed with an engaging surface extending obliquely with respect to an axis of said braking rod, that engages slidably a second end of said braking rod opposite to said first end of said braking rod, and that is rotatable to drive said braking rod to move in a longitudinal direction, thereby resulting in the movement of said braking mechanism between the free and braking positions;

wherein said braking mechanism further includes a pedal movable with respect to said moving member for moving said moving member; wherein the pedal includes a protrusion extending towards the moving member and the moving member includes a first pedal engaging surface and a second pedal engaging surface adjacent to the first pedal engaging surface; and wherein said pedal is movable between an initial position wherein said braking mechanism is at the free position, and first and second positions wherein said braking mechanism is at the braking position; wherein the protrusion of the pedal engages the first pedal engaging surface at the free position and the protrusion engages the second pedal engaging surface during at least movement to the second position to the first position; wherein the first position is different from the second position.

4. The buggy as claimed in claim 3, wherein said engaging surface of said moving member is formed with a recess for receiving said second end therein of said braking rod when said braking mechanism is at the braking position.

5. The buggy as claimed in claim 3, wherein said pedal is movable between the first and second positions without moving said moving member.

6. The buggy as claimed in claim 5, wherein said pedal is provided with a torsion spring for biasing said pedal from the first position to the second position.

7. The buggy as claimed in claim 5, wherein said pedal is substantially flush with said frame when at the second position.

8. The buggy as claimed in claim 3, wherein:
said pedal is movable from the initial position in a first direction to the first position so as to rotate said moving member in the first direction to result in the movement of said braking mechanism from the free position to the braking position; and
said pedal is movable from the first position to the second position in a second direction opposite to the first direction, and is further movable in the second direction from the second position to the initial position so as to rotate said moving member in the second direction to result in the movement of said braking mechanism from the braking position back to the free position.

9. The buggy as claimed in claim 8, wherein the first direction comprises a component in downward direction, and the second direction comprises a component in upward direction.

10. The buggy as claimed in claim 3, wherein said moving member is rotatable around a rotational axis parallel to the axis of said braking rod, said engaging surface extending obliquely and radially with respect to the rotational axis.

11. The buggy as claimed in claim 10, where said pedal is rotatable around the rotational axis of said moving member.

12. The buggy as claimed in claim 3, wherein said braking rod includes a return spring for biasing said braking rod to move in a longitudinal direction, thereby resulting in the movement of said braking mechanism from the braking position to the free position.

* * * * *